US012631021B2

(12) United States Patent
Zhang et al.

(10) Patent No.: US 12,631,021 B2
(45) Date of Patent: May 19, 2026

(54) FLEXIBLE LIGHTWEIGHT MULTI-LAYER PANEL FOR SOUND INSULATION APPLICATION IN CONSTRUCTION

(71) Applicant: Nano and Advanced Materials Institute Limited, Hong Kong (HK)

(72) Inventors: Liang Zhang, Hong Kong (HK); Bin Xiao, Hong Kong (HK); Pingjian Zhou, Hong Kong (HK); Chun Kwong Yeung, Hong Kong (HK); Jifan Li, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 355 days.

(21) Appl. No.: 18/489,878

(22) Filed: Oct. 19, 2023

(65) Prior Publication Data

US 2025/0129599 A1 Apr. 24, 2025

(51) Int. Cl.
| | |
|---|---|
| *E04B 1/86* | (2006.01) |
| *B32B 27/06* | (2006.01) |
| *B32B 27/12* | (2006.01) |
| *B32B 27/30* | (2006.01) |
| *B32B 27/40* | (2006.01) |
| *E04B 1/84* | (2006.01) |
| *G10K 11/168* | (2006.01) |

(52) U.S. Cl.
CPC ............. *E04B 1/86* (2013.01); *B32B 27/065* (2013.01); *B32B 27/12* (2013.01); *B32B 27/304* (2013.01); *B32B 27/40* (2013.01); *B32B 2250/05* (2013.01); *B32B 2250/40* (2013.01); *B32B 2266/0278* (2013.01); *B32B*
*2307/102* (2013.01); *B32B 2307/536* (2013.01); *B32B 2307/718* (2013.01); *B32B 2307/72* (2013.01); *B32B 2307/7376* (2023.05); *B32B 2419/00* (2013.01); *E04B 2001/8461* (2013.01); *G10K 11/168* (2013.01)

(58) Field of Classification Search
CPC . E04B 1/86; E04B 2001/8461; B32B 27/065; B32B 27/12; B32B 27/304; B32B 27/40; B32B 2307/7376; B32B 2307/536; B32B 2307/72; B32B 2250/05; B32B 2250/40; B32B 2266/0278; G10K 11/168
See application file for complete search history.

(56) References Cited

U.S. PATENT DOCUMENTS

| | | | | |
|---|---|---|---|---|
| 4,130,175 A | * | 12/1978 | Hehmann | .............. G10K 11/16 428/116 |
| 4,488,619 A | * | 12/1984 | O'Neill | ..................... B32B 7/12 428/317.1 |
| 4,825,974 A | * | 5/1989 | Hoffmann | ................. B32B 7/06 181/290 |

(Continued)

*Primary Examiner* — Forrest M Phillips
(74) *Attorney, Agent, or Firm* — IDEA Intellectual Limited; Sam T. Yip

(57) ABSTRACT

The present invention provides a flexible lightweight sound insulation panel composed of multiple layers aligned in a sequence of high-density sound insulation layer, sound damping layer, medium-density sound reflection layer, low-density sound absorption layer, medium-density sound reflection layer, sound damping layer, and high-density sound insulation layer. The sound damping layer is composed of polyurethane foam. The flexible lightweight multi-layer panel has Sound Transmission Class (STC) of at least 40 dB according to ASTM E90.

19 Claims, 3 Drawing Sheets sound insulation panel

(56)            References Cited

U.S. PATENT DOCUMENTS

| | | | | |
|---|---|---|---|---|
| 5,504,282 | A * | 4/1996 | Pizzirusso | G10K 11/168 |
| | | | | 181/290 |
| 7,320,739 | B2 * | 1/2008 | Thompson, Jr. | B60R 13/083 |
| | | | | 156/196 |
| 10,460,715 | B2 * | 10/2019 | Bush | B60R 13/083 |
| 11,541,626 | B2 * | 1/2023 | Bush | B32B 27/12 |
| 2005/0230027 | A1 * | 10/2005 | Kassa | C08G 18/10 |
| | | | | 156/331.4 |
| 2014/0246268 | A1 * | 9/2014 | Fushiki | B60R 13/083 |
| | | | | 181/290 |
| 2016/0309260 | A1 * | 10/2016 | Bohm | H04R 31/003 |
| 2021/0148112 | A1 * | 5/2021 | Klein | B32B 7/02 |

* cited by examiner sound insulation panel (1) high-density sound insulation layer
(2) sound damping layer
(3) medium-density sound reflection layer
(4) low-density sound absorption layer (1)     (2)     (3)          (4)          (3)     (2)     (1)

(1) high-density sound insulation layer
(2) sound damping layer
(3) medium-density sound reflection layer
(4) low-density sound absorption layer (1)    (3)    (2)         (4)         (2)    (3)    (1)

FLEXIBLE LIGHTWEIGHT MULTI-LAYER PANEL FOR SOUND INSULATION APPLICATION IN CONSTRUCTION

FIELD OF THE INVENTION

The present invention generally relates to a flexible lightweight multi-layer panel for sound insulation application. More specifically, the present invention involves lightweight polyurethane foams used for sound insulation and damping.

BACKGROUND OF THE INVENTION

Noise pollution poses problems for people nowadays. The most common health problem it causes is Noise Induced Hearing Loss (NIHL). Exposure to loud noise can also give rise to high blood pressure, heart disease, sleep disturbances, and stress. In addition, noise pollution has many sources, including but not limited to, transportation noise, industrial noise, community noise, household, aircraft and ships noise. For eliminating the unfavorable influence of noise on people, the efficient method is to utilize sound reflection and absorption to increase sound transmission loss. Many different materials can be used as the construction materials for sound insulation and sound absorption, which is based upon the sound reflection or absorption of the sound transmission mechanism.

Construction materials having sound insulating properties are dense and heavy materials that would reflect the sound back into a room without penetrating through the other side. In order to increase sound transmission loss (the efficiency of sound insulating properties), construction design materials use mineral wool, fiberglass or foam as the cavity partitions, fillers of timber, and metal party walls. A noise controlling mechanism for a construction material is accomplished when a metal sheet or a hard layer of walls from the outside can reflect the sound; whereas the inner batt mineral wool or fiberglass from the inside can absorb the transmission sound. This batt design can maximally limit the sound transmission from the inside to outside or vice versa.

However, the above-mentioned materials having sound insulating property have the following limitations:

(1) The overall weight of the sound insulation panel is heavy. In order to increase sound insulation properties, the common method is to increase the surface density of sound insulation materials according to mass law. However, this leads to a heavy product which is not welcomed in lightweight demands in market.

(2) Sandwiched design is an improved method to reduce weight while maintaining the STC. However, simple sandwiched design could not maximally inspire the sound insulation property because the function of each layer is limited. For example, dense layer is for sound insulation only, but no damping effect could be considered to further reduce the sound transmission.

Thus, there is a need in the art for lightweight construction materials with high sound insulation properties. The present invention addresses this need.

SUMMARY OF THE INVENTION

In order to overcome the presented technical problems, flexible lightweight construction materials with multi-layered sound insulation design capable of achieving a Sound Transmission Class (STC) of at least 40 dB according to ASTM E90 have been developed.

In a first aspect, the present invention provides a flexible lightweight multi-layer panel for sound insulation applications in construction. The lightweight multi-layer panel includes:

at least two high-density sound insulation layers (1);

at least two sound damping layers (2);

at least two medium-density sound reflection layers (3); and at least one low-density sound absorption layer (4).

In one of the embodiments, the flexible lightweight construction material is seven-layered sound insulation design. The layers are aligned in sequence of high-density sound insulation layer (1), sound damping layer (2), medium-density sound reflection layer (3), low-density sound absorption layer (4), medium-density sound reflection layer (3), sound damping layer (2), and high-density sound insulation layer (1).

In one of the embodiments, the high-density sound insulation layer (1) includes a polymer composite comprising poly(vinyl chloride), chlorinated polyethylene, or a combination thereof.

In one of the embodiments, the high-density sound insulation layer (1) has a Shore hardness of 40A to 60A, a density from 2.0 $g/cm^3$ to 2.3 $g/cm^3$, and a thickness of 5 mm to 6 mm.

In one of the embodiments, the sound damping layer (2) contains a polyurethane foam. The polyurethane foam includes:

(a) a first reaction composition (A-side) containing at least one aromatic isocyanate component with an isocyanate functionality ranging from about 2 to about 2.5; and (b) a second reaction composition (B-side) having:
a diol with a hydroxyl value from 380 to 480 mgKOH/g;
a polyether polyol with a hydroxyl value from 140 to 330 mgKOH/g;
a polymer polyol with a hydroxyl value from 20 to 30 mgKOH/g;
a catalyst;
a foam stabilizer; and
water.

In one of the embodiments, the first reaction composition and the second reaction composition are contacted in stoichiometric ratio of NCO:OH functionality from 0.9:1 to 1.4:1.

Preferably, the first reaction composition and the second reaction composition are contacted in stoichiometric ratio of NCO:OH functionality from 1.1:1 to 1.3:1.

In one of the embodiments, the at least one aromatic isocyanate component includes aromatic diols and polyisocyanates.

In one of the embodiments, the diol is used for enhancing mechanical strength of the polyurethane foam and constitutes a weight percentage in the total weight of a plurality of polyols ranging from 2% to 8%.

In one of the embodiments, the polyether polyol is used for enhancing mechanical strength and tuning the glass transition temperature of the polyurethane foam and constitutes a weight percentage in a total weight of a plurality of polyols is from 25% to 40%.

In one of the embodiments, the polymer polyol is used for tuning softness and glass transition temperature of the polyurethane foam and constitutes a weight percentage in a total weight of a plurality of polyols from 45% to 70%.

In one of the embodiments, the sound damping layer (2) has a density of 0.2-0.3 $g/cm^3$ and a thickness of 2 mm to 4 mm.

In one of the embodiments, the medium-density sound insulation layer (3) contains a polymer composite comprising poly(vinyl chloride), chlorinated polyethylene, or a combination thereof. The medium-density sound insulation layer has Shore hardness of 60A to 80A, a density of 1.6 g/cm³ to 1.9 g/cm³, and a thickness of 2 mm to 4 mm.

In one of the embodiments, the low-density sound absorption layer (4) contains a synthetic fiber comprising glass fiber, polyester fiber, or a combination thereof. The low-density sound absorption layer (4) has a density of 0.3 g/cm³ to 0.6 g/cm³ and a thickness of 15 mm to 35 mm.

In one of the embodiments, the flexible lightweight multi-layer panel of claim 1, wherein the flexible lightweight multi-layer panel has a total thickness in a range of 40 to 50 mm, a weight in a range of 40 kg/m² to 50 kg/m².

BRIEF DESCRIPTION OF THE DRAWINGS

Embodiments of the invention are described in more details hereinafter with reference to the drawings, in which.

DETAILED DESCRIPTION

Figure 1:
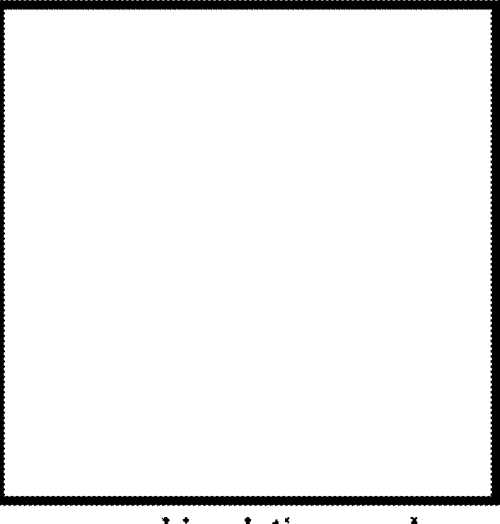
FIG. 1 is a sound insulation panel of the lightweight construction material according to an embodiment of the present invention.

In the following description, a multiple-layer sound insulation panel including damping polyurethane foam and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The flexible sound insulating panel of the present invention overcomes the issues such as heavy and thick and relatively low STC. It provides an acceptable reduction in sound (for example, a sound transmission class (STC) coefficient of at least 40 dB, preferably, at least 45 dB) at thicknesses on the order of 40 mm to 50 mm and weight on the order of 46 kg to 47 kg per meter square.

The present invention provides a flexible lightweight multi-layer panel for sound insulation applications in construction, including at least two high-density sound insulation layers, at least two sound damping layers, at least two medium-density sound reflection layers and at least one low-density sound absorption layer.

In accordance with one embodiment of the present invention, the sound insulation panel is formed from seven layers, including two high-density sound insulation layers (1); two sound damping layers (2); two medium-density sound reflection layers (3); and one low-density sound absorption layer (4). It should be noted, however, that the sound insulation panel of the present invention can also be constructed with more than seven layers without compromising its performance.

In accordance with one embodiment of the present invention, when the sound insulation panel is formed from seven layers, the layers are aligned in sequence of high-density sound insulation layer, sound damping layer, medium-density sound reflection layer, low-density sound absorption layer, medium-density sound reflection layer, sound damping layer, and high-density sound insulation layer.

In accordance with another embodiment of the present invention, when the sound insulation panel is formed from seven layers, the layers are aligned in sequence of high-density sound insulation layer, medium-density sound reflection layer, sound damping layer, low-density sound absorption layer, sound damping layer, medium-density sound reflection layer, and high-density sound insulation layer.

In accordance with one embodiment of the present invention, the high-density sound insulation layer (1) comprises a polymer composite comprising at least one of poly(vinyl chloride) and chlorinated polyethylene.

In accordance with one embodiment of the present invention, the high-density sound insulation layer (1) has a Shore hardness of 40A-60A, a density of 2.0-2.3 g/cm³ and thickness of 5-6 mm.

In accordance with one embodiment of the present invention, the sound damping layer (2) is a polyurethane foam (FIG. 1). The polyurethane foam includes a first reaction composition (A-side), and a second reaction composition (B-side).

The A-side contains at least one aromatic isocyanate component having isocyanate functionality of from about 2 to about 2.5. The B-side contains:
- a diol having a hydroxyl value from 380 to 480 mgKOH/g;
- a polyether polyol having a hydroxyl value from 140 to 330 mgKOH/g;
- a polymer polyol having a hydroxyl value from 20 to 30 mgKOH/g;
- a catalyst;
- a foam stabilizer; and
- water.

In accordance with one embodiment of the present invention, the diol may be commercial brands Polypropylene glycol (PPG) and Polyethylene glycol (PEG).

In accordance with one embodiment of the present invention, the polyether polyol may be commercial brands MN-500, MN-700, MN1000, DL400 and T-403.

In accordance with one embodiment of the present invention, the polymer polyol may be commercial brands POP36/28, POP93/28 and HPOP40.

In accordance with one embodiment of the present invention, the first reaction composition (A-side) and the second reaction composition (B-side) are contacted in stoichiometric ratio of NCO:OH functionality from 0.9:1 to 1.4:1, preferably from 1.1:1 to 1.3:1.

In one aspect, the at least one aromatic isocyanate component may be aromatic diisocyanates and polyisocyanates, such as, for example, toluene-2,4-diisocyanate (TDI100) and toluene-2,6-diisocyanate and corresponding isomer mixtures, diphenylmethane-4,4'-diisocyanate (MDI100), liquified MDI (for example, MDI100HL and MDI100LL), diphenylmethane-2,4'-diisocyanate, diphenylmethane-2,2'-diisocyanate and corresponding isomer mixtures, mixtures of diphenylmethane 4,4'- and 2,4'-diisocyanates (MDI50), mixtures of diphenylmethane 4,4'-, 2,4'- and 2,2'-diisocyanates and liquified MDI with toluene-2,4-diisocyanate (TDI100) and toluene-2,6-diisocyanate, polyphenylpolymethylene polyisocyanates (PMDI), mixtures of diphenylmethane 4,4'-, 2,4'- and 2,2'-diisocyanates and liquified MDI with polyphenylpolymethylene polyisocyanates (PMDI), and mixtures of PMDI with toluene diisocyanates.

In accordance with one embodiment of the present invention, the diol is used for enhancing mechanical strength of the polyurethane foam, and its weight percentage in total weight of a plurality of polyols is from 2% to 8%. The polyether polyol is used for enhancing mechanical strength and tuning the glass transition temperature of the polyurethane foam, and its weight percentage in total weight of a plurality of polyols is from 25% to 40%. The polymer polyol is used for tuning softness and glass transition temperature of the polyurethane foam, and its weight percentage in total weight of a plurality of polyols is from 45% to 70%.

In accordance with one embodiment of the present invention, the sound damping layer (2) has a density of 0.2-0.3 g/cm$^3$ and a thickness of 2-4 mm.

In accordance with one embodiment of the present invention, the catalysts may be selected from tertiary amines and organic tin compounds, such as, for example, triethylamine, dimethylcyclohexylamine, N-methylmorpholine, N,N'-dimethylpiperazine, 2-(dimethylaminoethoxy)ethanol, diazabicyclo[2.2.2]octane, bis[2-(N,N-dimethylamino)ethyl]ether (A1), 1,4-diazabicyclo[2.2.2]octane (A33), tin diacetate, tin dioctanoate, tin dilaurate or the dialkyl derivatives of dialkyltin salts of aliphatic carboxylic acids, such as dibutyltin diacetate and dibutyltin dilaurate (DBTDL).

In accordance with one embodiment of the present invention, the foam stabilizer may be commercials brands Evonik's TEGOSTAB, Covestro DESMODUR and DESMOPHEN, Dow VORASURF and Huntsman's JEFFADD.

In accordance with one embodiment of the present invention, the medium-density sound insulation layer (3) contains a polymer composite including at least one of poly(vinyl chloride) and chlorinated polyethylene.

In accordance with one embodiment of the present invention, the medium-density sound insulation layer (3) has a Shore hardness of 60A-80A, a density of 1.6-1.9 g/cm$^3$ and a thickness 2-4 mm.

In accordance with one embodiment of the present invention, the low-density sound absorption layer (4) contains a synthetic fiber including at least one of glass fiber and polyester fiber.

In accordance with one embodiment of the present invention, the low-density sound absorption layer (4) has a density of 0.3-0.6 g/cm$^3$ and a thickness of 15-35 mm.

EXAMPLE

Example 1

In this example, a sound insulation panel having five-layers was provided. The five layers contain two high-density sound insulation layers (1); two medium-density sound reflection layers (2); and one low-density sound absorption layer (3). The layers are aligned in sequence of high-density sound insulation layer (1), medium-density sound reflection layer (2), low-density sound absorption layer (3), medium-density sound reflection layer (2), and high-density sound insulation layer (1). Table 1 showed the properties for the sound insulation panel in 1 meter square.

TABLE 1

| Sound insulation panel | Index |
|---|---|
| Thickness (mm) | 40 |
| Weight (kg/m$^2$) | 46.5 |
| Sound insulation STC[1] | 38 |

[1]Sound Transmission Class (STC) was evaluated according to ASTM E90.

Example 2

Figure 2:
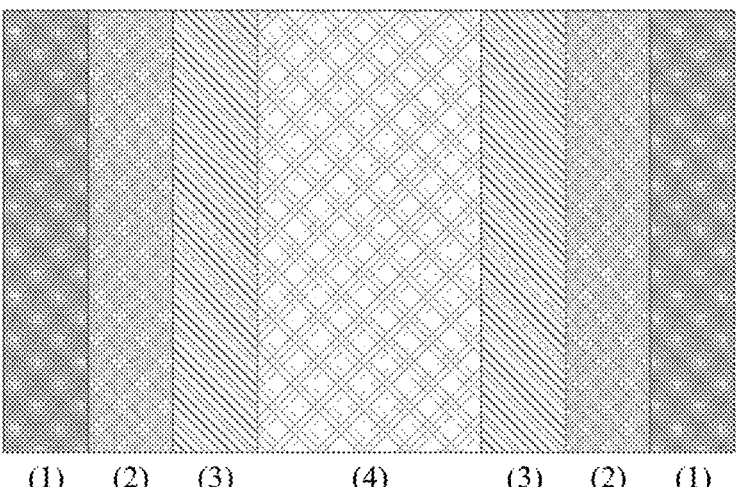
FIG. 2 shows a schematic diagram of a multiple-layer sound insulation panel according to an embodiment of the present invention.

In this example, a sound insulation panel having seven layers was provided. The seven layers contain two high-density sound insulation layers (1); two sound damping layers (2); two medium-density sound reflection layers (3); and one low-density sound absorption layer (4). Referring to FIG. 2, the layers were aligned in sequence of wherein the layers are aligned in sequence of high-density sound insulation layer (1), sound damping layer (2), medium-density sound reflection layer (3), low-density sound absorption layer (4), medium-density sound reflection layer (3), sound damping layer (2), and high-density sound insulation layer (1).

Formulation of the first part and second part of the sound damping PU foam was presented in Table 2a and Table 2b, respectively.

TABLE 2a

| Ingredient in Part A | Phr |
|---|---|
| MDI100LL | 50 |
| TDI80 | 50 |

TABLE 2b

| Ingredient in Part B | Phr | Role |
|---|---|---|
| DPG | 6 | Diol |
| DL400 | 35 | Polyether polyol |
| POP93/28 | 65 | Polymer polyol |
| 8002 | 0.3 | Foam stabilizer |
| DBTDL | 0.3 | Catalyst |
| A1 | 0.5 | Catalyst |
| H$_2$O | 0.6 | Blowing agent |

Table 3 showed the properties for the sound insulation panel in 1 meter square.

TABLE 3

| Sound insulation panel | Index |
|---|---|
| Thickness (mm) | 40 |
| Weight (kg/m$^2$) | 47.7 |
| Sound insulation STC[1] | 47 |

[1]Sound Transmission Class (STC) was evaluated according to ASTM E90.

Example 3

Figure 3:
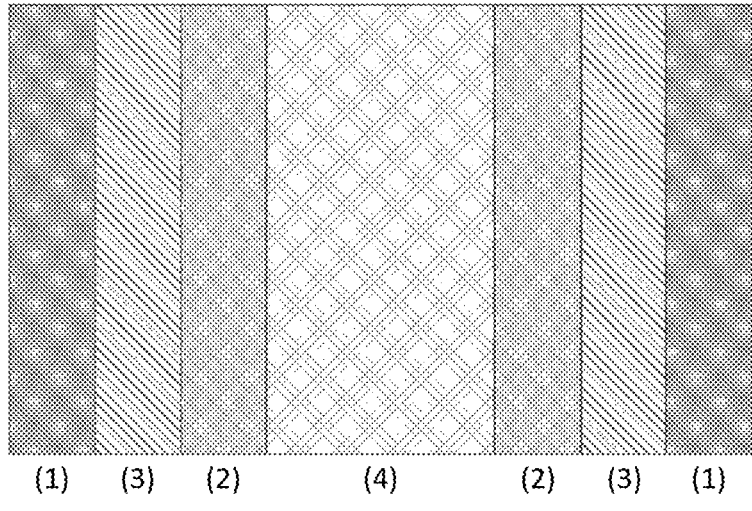
FIG. 3 shows a schematic diagram of a multiple-layer sound insulation panel according to another embodiment of the present invention.

In this example, a sound insulation panel having seven layers was provided. The seven layers contain two high-density sound insulation layers (1); two sound damping layers (2); two medium-density sound reflection layers (3); and one low-density sound absorption layer (4). Referring to FIG. 3, The layers were aligned in sequence of high-density sound insulation layer (1), medium-density sound reflection layer (3), sound damping layer (2), low-density sound absorption layer (4), sound damping layer (2), medium-density sound reflection layer (3), and high-density sound insulation layer (1).

Formulation of the first part and second part of the sound damping PU foam was presented in Table 4a and Table 4b, respectively.

TABLE 4a

| Ingredient in Part A | Phr |
|---|---|
| MDI100LL | 50 |
| TDI80 | 50 |

TABLE 4b

| Ingredient in Part B | Phr | Role |
|---|---|---|
| DPG | 6 | Diol |
| DL400 | 35 | Polyether polyol |
| POP93/28 | 65 | Polymer polyol |
| 8002 | 0.3 | Foam stabilizer |
| DBTDL | 0.3 | Catalyst |
| A1 | 0.5 | Catalyst |
| H$_2$O | 0.6 | Blowing agent |

Table 5 showed the properties for the sound insulation panel in 1 meter square.

TABLE 5

| Sound insulation panel | Index |
|---|---|
| Thickness (mm) | 40 |
| Weight (kg/m$^2$) | 47.7 |
| Sound insulation STC[1] | 43 |

[1]Sound Transmission Class (STC) was evaluated according to ASTM E90.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

What is claimed is:

1. A flexible lightweight multi-layer panel for sound insulation applications in construction, comprising:
   at least two high-density sound insulation layers having a density of 2.0 g/cm$^3$ to 2.3 g/cm$^3$;
   at least two sound damping layers;
   at least two medium-density sound reflection layers having a density of 1.6 g/cm$^3$ to 1.9 g/cm$^3$; and
   at least one low-density sound absorption layer having a density of 0.3 g/cm$^3$ to 0.6 g/cm$^3$;
   wherein the flexible lightweight multi-layer panel has Sound Transmission Class (STC) of at least 40 dB according to ASTM E90;
   wherein the at least two high-density sound insulation layers, the at least two sound damping layers and the at least two medium-density sound reflection layers are symmetrically arranged about the low-density sound absorption layer, such that the low-density sound absorption layer is positioned at a center of the panel, and is sandwiched between the medium-density sound reflection layers, the sound damping layers, and the high-density sound insulation layers.

2. The flexible lightweight multi-layer panel of claim 1, wherein the layers are aligned in sequence of high-density sound insulation layer, sound damping layer, medium-density sound reflection layer, low-density sound absorption layer, medium-density sound reflection layer, sound damping layer, and high-density sound insulation layer.

3. The flexible lightweight multi-layer panel of claim 1, wherein the layers are aligned in sequence of high-density sound insulation layer, medium-density sound reflection layer, sound damping layer, low-density sound absorption layer, sound damping layer, medium-density sound reflection layer, and high-density sound insulation layer.

4. The flexible lightweight multi-layer panel of claim 1, wherein the high-density sound insulation layer comprises a polymer composite comprising poly (vinyl chloride), chlorinated polyethylene, or a combination thereof.

5. The flexible lightweight multi-layer panel of claim 1, wherein the high-density sound insulation layer has a Shore hardness of 40A to 60A, and a thickness of 5 mm to 6 mm.

6. The flexible lightweight multi-layer panel of claim 1, wherein the sound damping layer comprises a polyurethane foam.

7. The flexible lightweight multi-layer panel of claim 6, wherein the polyurethane foam comprises:

a first reaction composition containing at least one aromatic isocyanate component with an isocyanate functionality ranging from about 2 to about 2.5; and a second reaction composition comprising:

a diol with a hydroxyl value from 380 to 480 mgKOH/g;

a polyether polyol with a hydroxyl value from 140 to 330 mgKOH/g;

a polymer polyol with a hydroxyl value from 20 to 30 mgKOH/g;

a catalyst;

a foam stabilizer; and water.

8. The flexible lightweight multi-layer panel of claim 7, wherein the first reaction composition and the second reaction composition are contacted in stoichiometric ratio of NCO:OH functionality from 0.9:1 to 1.4:1.

9. The flexible lightweight multi-layer panel of claim 8, wherein the first reaction composition and the second reaction composition are contacted in stoichiometric ratio of NCO:OH functionality from 1.1:1 to 1.3:1.

10. The flexible lightweight multi-layer panel of claim 7, the at least one aromatic isocyanate component comprises aromatic diols and polyisocyanates.

11. The flexible lightweight multi-layer panel of claim 7, the diol is used for enhancing mechanical strength of the polyurethane foam and constitutes a weight percentage in a total weight of a plurality of polyols ranging from 2% to 8%.

12. The flexible lightweight multi-layer panel of claim 7, the polyether polyol is used for enhancing mechanical strength and tuning the glass transition temperature of the polyurethane foam and constitutes a weight percentage in a total weight of a plurality of polyols from 25% to 40%.

13. The flexible lightweight multi-layer panel of claim 7, the polymer polyol is used for tuning softness and glass transition temperature of the polyurethane foam and constitutes a weight percentage in a total weight of a plurality of polyols from 45% to 70%.

14. The flexible lightweight multi-layer panel of claim 1, wherein the sound damping layer has a density of 0.2-0.3 $g/cm^3$ and a thickness of 2 mm to 4 mm.

15. The flexible lightweight multi-layer panel of claim 1, wherein the medium-density sound insulation layer comprises a polymer composite comprising poly (vinyl chloride), chlorinated polyethylene, or a combination thereof.

16. The flexible lightweight multi-layer panel of claim 1, wherein the medium-density sound insulation layer has Shore hardness of 60A to 80A, and a thickness of 2 mm to 4 mm.

17. The flexible lightweight multi-layer panel of claim 1, wherein the low-density sound absorption layer comprises a synthetic fiber comprising glass fiber, polyester fiber, or a combination thereof.

18. The flexible lightweight multi-layer panel of claim 1, wherein the low-density sound absorption layer has a thickness of 15 mm to 35 mm.

19. The flexible lightweight multi-layer panel of claim 1, wherein the flexible lightweight multi-layer panel has a total thickness in a range of 40 to 50 mm, a weight in a range of 40 $kg/m^2$ to 50 $kg/m^2$.

* * * * *